United States Patent
Sakano et al.

(10) Patent No.: US 8,548,226 B2
(45) Date of Patent: Oct. 1, 2013

(54) STEREO IMAGE PROCESSING DEVICE AND METHOD

(75) Inventors: Morihiko Sakano, Hitachinaka (JP); Mirai Higuchi, Mito (JP); Takuya Naka, Hitachinaka (JP); Takeshi Shima, Mito (JP); Shoji Muramatsu, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 847 days.

(21) Appl. No.: 12/711,787

(22) Filed: Feb. 24, 2010

(65) Prior Publication Data

US 2010/0328427 A1    Dec. 30, 2010

(30) Foreign Application Priority Data

Jun. 30, 2009 (JP) ................................. 2009-154518

(51) Int. Cl.
  *G06K 9/00* (2006.01)
  *G06K 9/44* (2006.01)

(52) U.S. Cl.
  USPC ........... 382/154; 382/104; 382/106; 382/260; 382/264; 382/278

(58) Field of Classification Search
  USPC .................. 382/154, 104, 106, 260, 264, 278
  See application file for complete search history.

(56) References Cited

U.S. PATENT DOCUMENTS

| | | | | |
|---|---|---|---|---|
| 5,577,130 A | * | 11/1996 | Wu | 382/106 |
| 5,719,954 A | * | 2/1998 | Onda | 382/154 |
| 7,292,735 B2 | * | 11/2007 | Blake et al. | 382/275 |
| 7,324,687 B2 | * | 1/2008 | Zitnick et al. | 382/154 |
| 8,326,025 B2 | * | 12/2012 | Boughorbel | 382/154 |

(Continued)

FOREIGN PATENT DOCUMENTS

| | | |
|---|---|---|
| JP | 05-256613 | 10/1993 |
| JP | 10-283474 | 10/1998 |

OTHER PUBLICATIONS

Kanade, et al. "A Stereo Matching Algorithm with an Adaptive Window: Theory and Experiment." IEEE Transaction on Pattern Analysis and Machine Intelligence. 16.9 (1994): 920-932. Print.*

(Continued)

*Primary Examiner* — Michael A Newman
(74) *Attorney, Agent, or Firm* — Antonelli, Terry, Stout & Kraus, LLP.

(57) ABSTRACT

In stereo matching based on standard area matching, in order to suppress a decrease in matching accuracy, it is effective to adaptively change a matching area in accordance with the local properties of an image. However, this requires high calculation costs. Thus, the present invention provides a stereo image processing apparatus including an image pickup unit 101 configured to take a plurality of image data using a plurality of cameras, an image memory 102 configured to store the plurality of image data taken by the image pickup unit 101, a calculated disparity storage unit 105 configured to store disparity data determined based on the plurality of image data, a matching area control unit 103 configured to set a matching area for each pixel based on the plurality of data read from the image memory 102 and the disparity data read from the calculated disparity storage unit 105, and a disparity calculating unit 104 configured to perform matching on the image data based on the plurality of image data read from the image memory 102 and the matching area for each pixel set by the matching area control unit 103 to calculate disparity data.

12 Claims, 16 Drawing Sheets

(56) References Cited

U.S. PATENT DOCUMENTS

| | | | | |
|---|---|---|---|---|
| 2004/0252863 | A1* | 12/2004 | Chang et al. | 382/104 |
| 2005/0286756 | A1* | 12/2005 | Hong et al. | 382/154 |
| 2009/0141967 | A1* | 6/2009 | Hattori | 382/154 |
| 2011/0044531 | A1* | 2/2011 | Zhang et al. | 382/154 |

OTHER PUBLICATIONS

Moallem, et al. "Search Space Reduction in the Edge Based Stereo Matching by Context of Disparity Gradient Limit." Image and Signal Processing and Analysis, 2001. ISPA 2001. Proceedings of the 2nd International Symposium on. (2001): 164-169. Print.*

Mass, et al. "Area-Based Computation of Stereo Disparity with Model-Based Window Size Selection." Computer Vision and Pattern Recognition, 1999. IEEE Computer Society Conference on. 1. (1999): 106-112. Print.*

Papadimitriou, et al. "Nonlinear Smoothing of Stereo Disparity Maps." Electronics Letters. 30.5 (1994): 391-393. Print.*

* cited by examiner

Stereo image processing apparatus 1

Stereo image processing apparatus 2

Stereo image processing apparatus 3

Stereo image processing apparatus 4

STEREO IMAGE PROCESSING DEVICE AND METHOD

BACKGROUND OF THE INVENTION

1. Field of the Invention

The present invention relates to a stereo image processing method and a stereo image processing apparatus.

2. Background Art

Standard stereo matching involves searching for a matching position using the similarity of an image feature amount including the value of luminance in a matching area. However, if the disparity changes significantly in the matching area, the similarity cannot be correctly determined due to the effect of a difference in distortion. This results in reduced matching accuracy. To suppress a decrease in matching accuracy, the matching area may be reduced so as not to contain a disparity variation. However, a smaller matching area is susceptible to noise and contributes to increasing the possibility of the presence of a similar pattern. This results in the increased likelihood of mismatching. Thus, to increase the matching accuracy, the matching area is desirably formed to be as large as possible so as not to contain a significant disparity variation. As a method for achieving this, JP Patent Publication (Kokai) No. 5-256613 A (1993) discloses a method including calculating the disparity for each pixel using matching windows of different sizes, and employing a processing result obtained using a matching window having the best reliability; the reliability is an index indicative of validity of a matching window size calculated based on the continuity of the disparity. That is, JP Patent Publication (Kokai) No. 5-256613 A (1993) discloses a method of adaptively varying the size of the matching area on a pixel basis.

Furthermore, JP Patent Publication (Kokai) No. 10-283474 A (1998) discloses a depth information extracting apparatus and a depth information extracting method in which the progressively reduced size of the matching window is applied, in order to improve the matching accuracy.

However, JP Patent Publication (Kokai) No. 5-256613 A (1993) improves the matching accuracy but disadvantageously requires high calculation costs. Furthermore, like JP Patent Publication (Kokai) No. 5-256613 A (1993), JP Patent Publication (Kokai) No. 10-283474 A (1998) improves the matching accuracy but disadvantageously requires high calculation costs, because of the need for disparity calculations executed on each pixel using a plurality of matching windows.

An object of the present invention is to improve both the matching accuracy and speed of stereo matching based on area matching, with reduced calculation costs.

SUMMARY OF THE INVENTION

To accomplish the above-described object, the present invention provides a stereo image processing apparatus including; an image pickup unit configured to take a plurality of image data using a plurality of cameras; an image memory configured to store the plurality of image data taken by the image pickup unit; a calculated disparity storage unit configured to store disparity data obtained based on the plurality of image data; a matching area control unit configured to set a matching area for each pixel based on the disparity data read from the calculated disparity storage unit; and a disparity calculating unit configured to perform matching on the image data based on the plurality of image data read from the image memory and the matching area for each pixel set by the matching area control unit to calculate disparity data.

Furthermore, the present invention provides stereo image processing method including; taking a plurality of image data using a plurality of cameras, storing the plurality of taken image data in an image memory; setting a matching area for each pixel based on disparity data pre-stored in a calculated disparity storage unit; and performing matching on the plurality of image data based on the set matching area to calculate disparity data.

The present invention can improve both the matching accuracy and speed of stereo matching based on area matching, with reduced calculation costs.

DESCRIPTION OF SYMBOLS

| 1, 2, 3, 4 | Stereo image processing apparatuses |
|---|---|
| 4a, 4b | Cameras |
| 101 | Image pickup unit |
| 102 | Image memory |
| 103 | Matching area control unit |
| 104 | Disparity calculating unit |
| 105 | Calculated disparity storage unit |
| 202 | Disparity gradient calculating unit |
| 203 | Matching area calculating unit |
| 204 | Disparity edge-preserving smoothing filter |
| 1001 | Search range control unit |
| 1106 | Distance calculating unit |

DETAILED DESCRIPTION OF THE PREFERRED EMBODIMENTS

An embodiment of the present invention will be described below with reference to the drawings.

Figure 1:
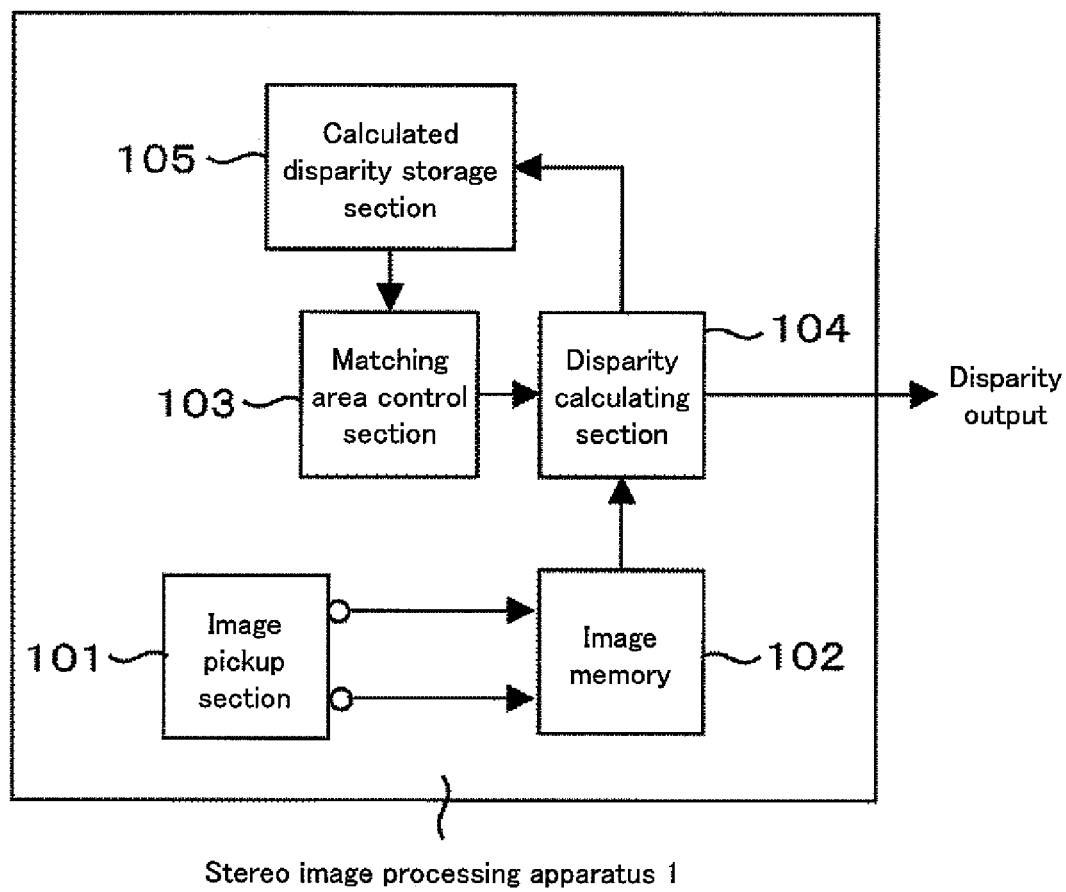
FIG. 1 is a diagram showing an example of the configuration of a stereo image processing apparatus according to the present invention.

First, a stereo image processing apparatus 1 in FIG. 1 will be described. The stereo image processing apparatus 1 includes an image pickup unit 101, an image memory 102, a matching area control unit 103, a disparity calculating unit 104, and a calculated disparity storage unit 105.

The stereo image processing apparatus 1 is mounted to, for example, a vehicle's interior room mirror section to pick up images of a forward view from the vehicle at a predetermined depression angle and a predetermined attachment position.

Figure 3:
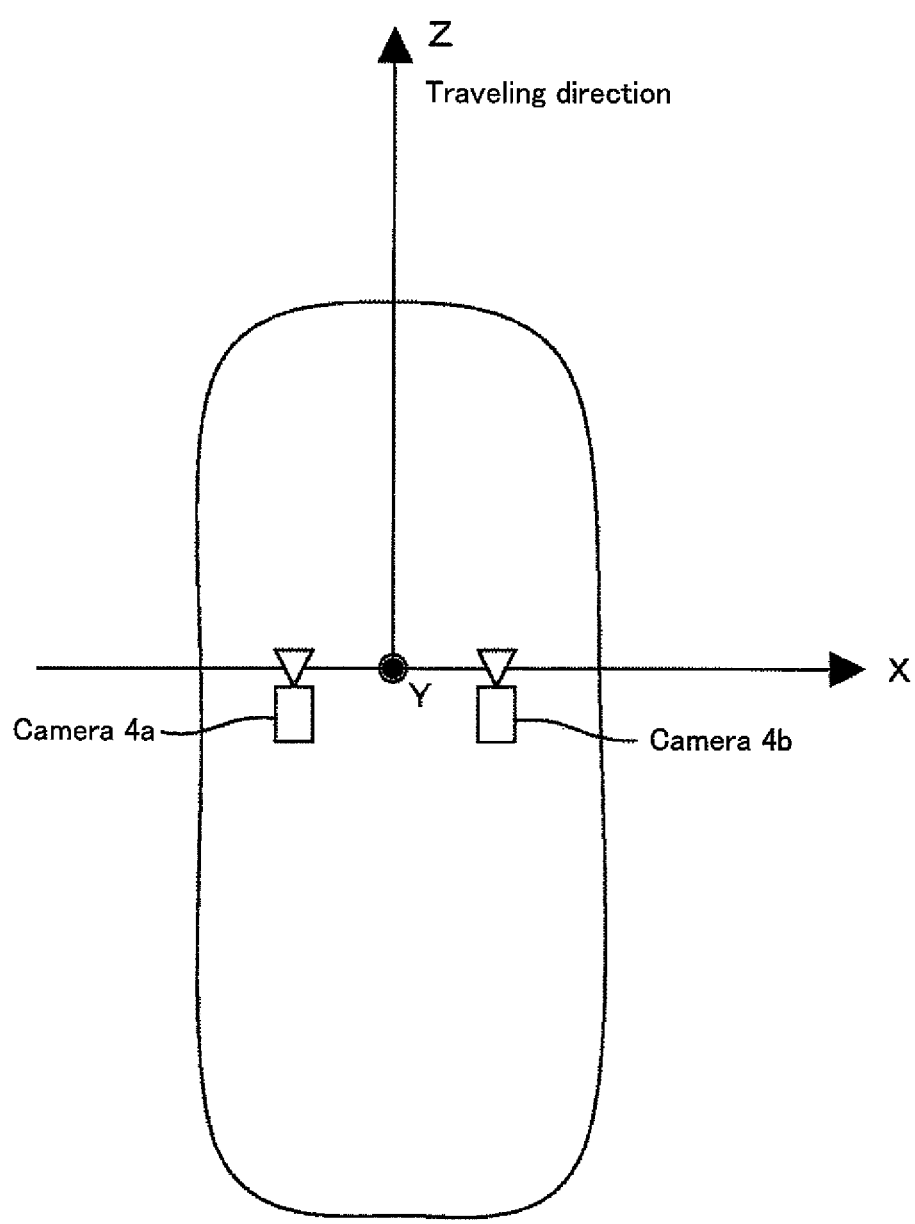
FIG. 3 is a diagram showing an example in which stereo cameras according to the present invention are installed as well as installation of coordinate axes.

The image pickup unit 101 includes cameras 4a and 4b corresponding to a plurality of image pickup devices shown in FIG. 3. A plurality of image data (image data from the camera 4a and image data from the camera 4b) of the forward view from the vehicle taken by the image pickup unit 101 are stored in the image memory 102 inside the stereo image processing apparatus 1. The stored plurality of image data are delivered to the disparity calculating unit 104, which calculates disparity using information in the calculated disparity storage unit 105.

The cameras 4a and 4b may be integrated with the stereo image processing apparatus 1. Alternatively, the results of distance calculations may be drawn on a display or the like. An installation method and an image pickup direction are not particularly limited.

Two images (first image data taken using the first camera provided on the left side of the vehicle and second image data taken using the second camera provided on the right side of the vehicle) taken by the image pickup unit 101 are transferred to the image memory 102, in which the images are stored as image data. The stored image data is read from the disparity calculating unit 104. The matching area control unit 103 uses disparity data in the calculated disparity storage unit 105 to set a matching area for each pixel. The calculated disparity storage unit 105 is configured to store disparity data obtained from a plurality of image data. For example, a disparity calculated using a front scan line is stored as disparity data, and the data is delivered to the matching area control unit 103. The disparity calculating unit 104 performs matching on image data based on the two image data stored in the image memory 102 and the matching area determined by the matching area control unit 103, to calculate disparity data.

Specifically, the disparity calculating unit 104 associates a point in one of the image data with a point in the other image data, and calculates the disparity for the points based on the positional relationship between the points. The disparity calculating unit 104 stores the disparity as disparity data in the calculated disparity storage unit 105. That is, the disparity data calculated by the disparity calculating unit 104 is stored in the calculated disparity storage unit 105. The disparity calculating unit 104 calculates disparity data by moving a calculation target downward on a scan line-by-scan line basis from the uppermost position of image data read from the image memory 102, or by moving the calculation target upward on a scan line-by-scan line basis from the lowermost position of the image data.

The image pickup unit 101 includes, for example, two cameras as shown in FIG. 3 but may utilize three cameras or more. Furthermore, infrared cameras may be utilized. This is expected to improve nighttime visibility. Alternatively, color cameras may be utilized so that color information can be processed by the succeeding processes.

The image memory 102 stores two image data obtained by the respective two cameras and involving different points of view, on the memory as right image data and left image data, respectively.

The matching area control unit 103 utilizes the disparity data stored in the calculated disparity storage unit 105 to control the size of a matching area independently for each pixel. In order to improve disparity calculation accuracy, the matching area is set so as not to contain a boundary where the disparity changes significantly because of occlusion and so as to be large. The shape of the matching area is not particularly limited. Processing by the matching area control unit 103 will be described later in detail.

The calculated disparity storage unit 105 is configured to store calculated disparity data to be utilized by the matching area control unit 103. Here, the calculated disparity refers to a disparity having a spatial adjacency relationship or a time sequence adjacency relationship with a disparity calculation target pixel. The calculated disparity refers to at least one of, for example, a disparity in one line above, a disparity in one line below, and a disparity for a pixel in the preceding frame which has a correspondence relationship. This is not limited to one-dimensional scan line information but generally relates to information on a disparity positioned spatially nearby or a disparity in the preceding frame which has a temporal correspondence relationship.

Calculation costs can be reduced by storing and reutilizing output results from the disparity calculating unit 104.

The disparity calculating unit 104 uses the matching area calculated for each pixel by the matching area control unit 103 to match the right and left images with each other. The disparity calculating unit 104 thus associates the right and left images with each other for each pixel to determine disparity. In the association of the points, for example, the uppermost or lowermost scan line in one of the images is noted, and the association is performed on each point with scanning carried out in the horizontal direction. When the association on the noted horizontal scan line is completed, the scan line is shifted one line above or below. Then, the association is performed on each point with scanning carried out in the horizontal direction. This processing is carried out on the entirety of the image. When the scanning starts from the uppermost scan line, the scan line positioned one line above is the preceding horizontal scan line. When the scanning starts from the lowermost scan line, the scan line positioned one line below is the preceding horizontal scan line.

Figure 2:
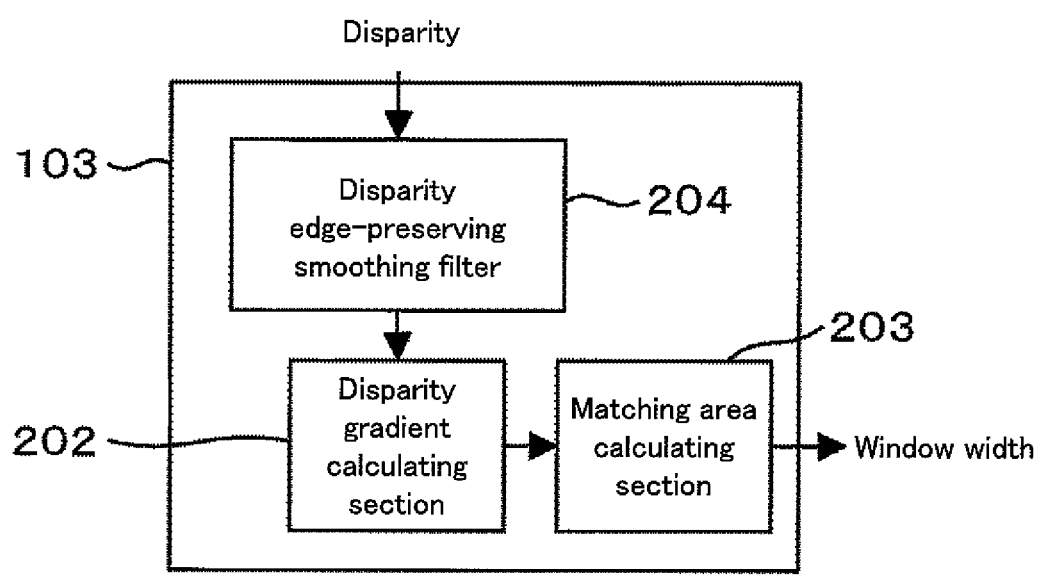
FIG. 2 is a diagram showing an example of the configuration of a matching area control unit according to the present invention.

Now, the matching area control unit 103 in FIG. 1 will be described with reference to FIG. 2.

The matching area control unit 103 includes a disparity gradient calculating unit 202 configured to calculate the gradient of a calculated disparity, a matching area calculating unit 203 configured to determine a window size for a matching area or the like using output information from the disparity gradient calculating unit 202, and a disparity edge-preserving smoothing filter 204 corresponding to a filter processing unit configured to smooth (remove noise from) the disparity data stored in the calculated disparity storage unit 105 with a steep edge maintained (with the characteristics of portions with a significant change in calculated disparity left). The matching area control unit 103 uses disparity gradient information to determine an appropriate matching area window size for each pixel.

Figure 4:
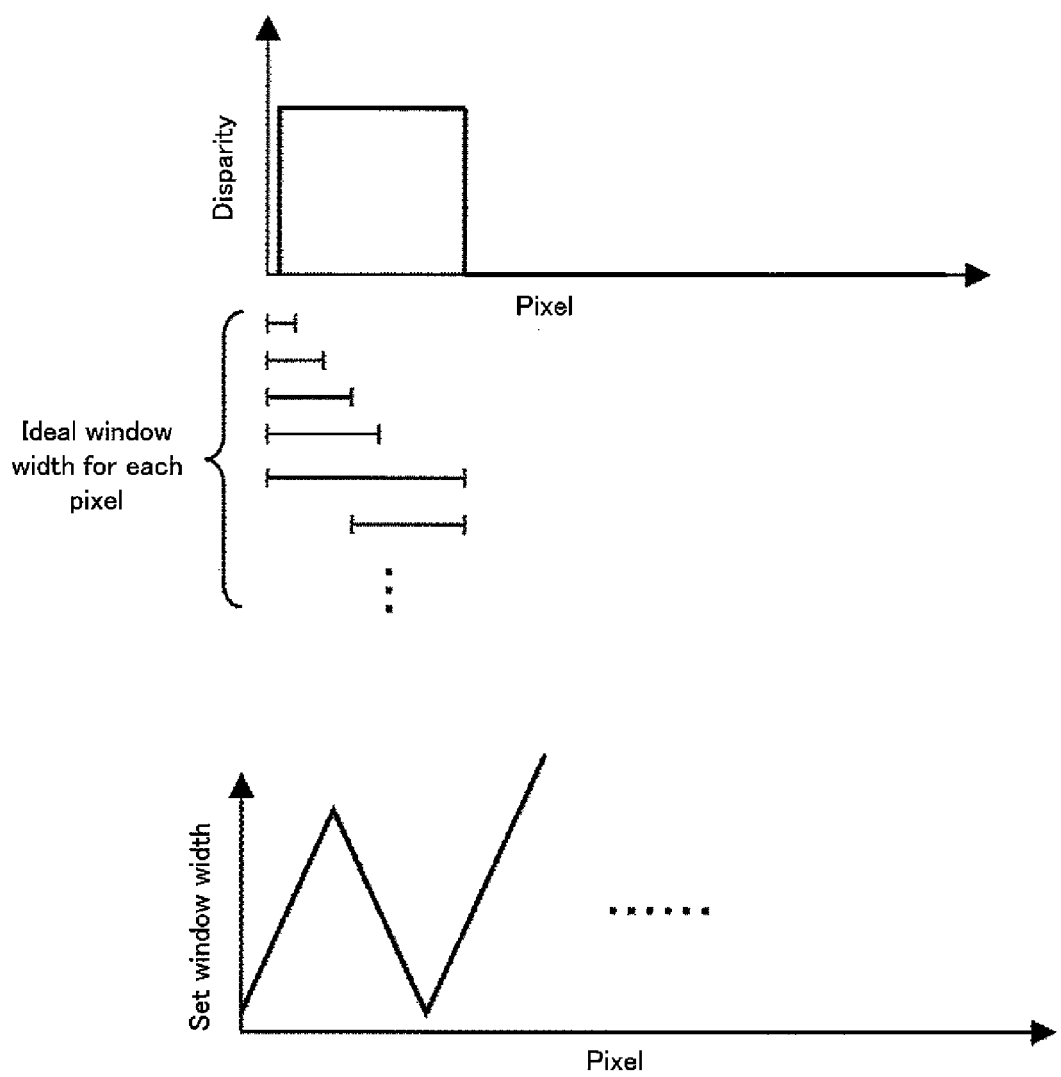
FIG. 4 is a diagram showing a method for setting the ideal window size for each pixel according to the present invention.

FIG. 4 shows how to set the ideal matching area window size (hereinafter referred to as the matching window size). As disclosed in various documents including JP Patent Publication (Kokai) No. 5-256613 A (1993), the matching window size is desirably such that the window contains no portion with the disparity significantly changed and is as large as possible so as to make matching more stable. Thus, the window size is set to be smaller for areas with the disparity significantly changed, that is, areas with larger disparity gradients, and to be larger for areas with the disparity insignificantly changed, that is, areas with smaller disparity gradients. The window size is set to be substantially medium for areas with substantially intermediate disparity changes. Furthermore, to allow this processing to be achieved at high speed, the following assumption is made: the calculated disparity corresponding to the scan line preceding a disparity calculation target pixel is almost equivalent to the disparity calculation target pixel. Thus, the processing is achieved without calculating the disparity for the target pixel. A specific calculation method will be described later.

The disparity gradient calculating unit 202 calculates the disparity gradient required for the matching area calculating unit 203. The disparity gradient is calculated by determining values for differences from disparities for adjacent pixels using the disparity data filtered by the disparity edge-preserving smoothing filter 204 for the calculated disparity data stored in the calculated disparity storage unit 105.

Figure 5:
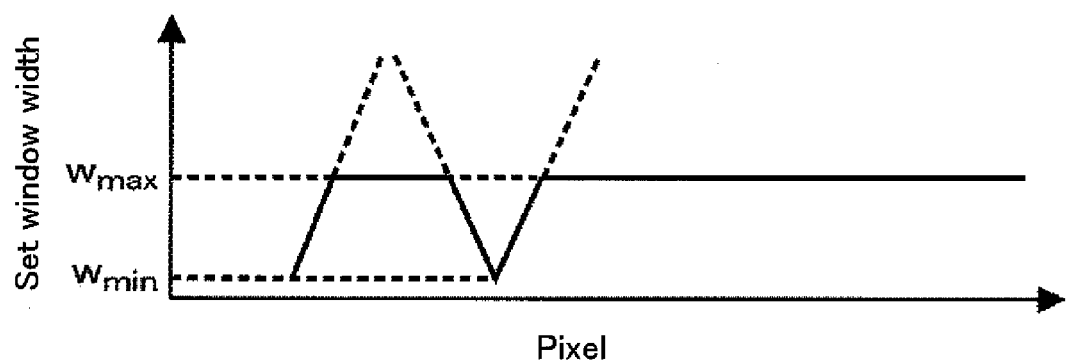
FIG. 5 is a diagram showing the maximum and minimum values of a matching window size according to the present invention.

The matching area calculating unit 203 uses the disparity gradient value calculated by the disparity gradient calculating unit 202 to set the appropriate matching window size (matching area window size) for each pixel. As shown in FIG. 4, the matching window size is set to be smaller for portions with larger disparity gradients and is set to be larger for portions with smaller disparity gradients. Alternatively, a window size is set which has a negative correlation with the disparity gradient value calculated by the disparity gradient calculating unit 202. The window size is set to be substantially medium for areas with substantially intermediate disparity changes. In actuality, in order to avoid the window size to be set to an unlimitedly large value, parameters for the minimum window size and the maximum window size are set so that the window size can be set to a value between the minimum and maximum window sizes in accordance with the disparity gradient value. That is, the matching area window size is set to a value between the preset minimum matching area window size ($W_{min}$) and the preset maximum matching area window size ($W_{max}$). This is shown in FIG. 5.

Furthermore, as shown in FIG. 4, the ideal window size desirably increases gradually from a pixel with the disparity significantly changed and then decreases gradually to the next pixel with the disparity significantly reduced. To achieve this, the following processing is executed to determine the window size.

First, the window size reference value is calculated as follows.

[Expression 1]

$$W = (W_{max} - W_{min}) \times g' + W_{min} \quad \text{(Expression 1)}$$

In the expression, W denotes the window size, $W_{max}$ denotes the maximum window size value, and $W_{min}$ denotes the minimum window size value. Furthermore, g' is as follows.

[Expression 2]

$$g' = \begin{cases} 1 & g < g_{low} \\ 1 - \dfrac{g - g_{low}}{g_{high} - g_{low}} & g_{low} \leq g \leq g_{high} \\ 0 & g > g_{high} \end{cases} \quad \text{(Expression 2)}$$

Figure 6:
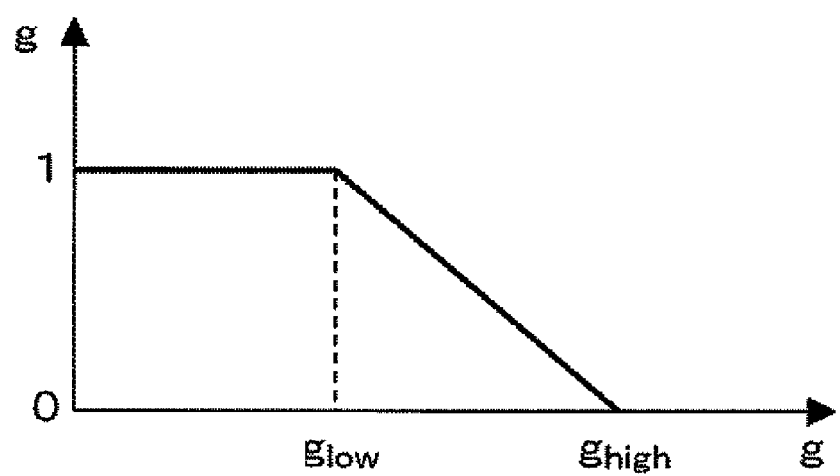
FIG. 6 is a diagram of a subfunction calculating a window size reference value from a disparity gradient according to the present invention.

Here, (g) denotes the disparity gradient value. As shown in FIG. 6, g' takes a value between 0 and 1. g' is 0 when the disparity gradient value (g) is larger than $g_{high}$ and is 1 when the disparity gradient value (g) is smaller than $g_{low}$, and varies linearly between $g_{low}$ and $g_{high}$. This is only illustrative of a method for setting g'. g' may be expanded to another function such as a nonlinear function.

Based on the definition of g', the window size W can be set to a value between $W_{min}$ and $W_{max}$. Furthermore, the window size W has the maximum value $W_{max}$ if the disparity gradient is smaller than $g_{low}$ and has the minimum value $W_{min}$ if the disparity gradient is larger than $g_{high}$. If the disparity gradient has a value between $g_{low}$ and $g_{high}$, the window size is set in accordance with the magnitude of the disparity gradient.

Figure 7:
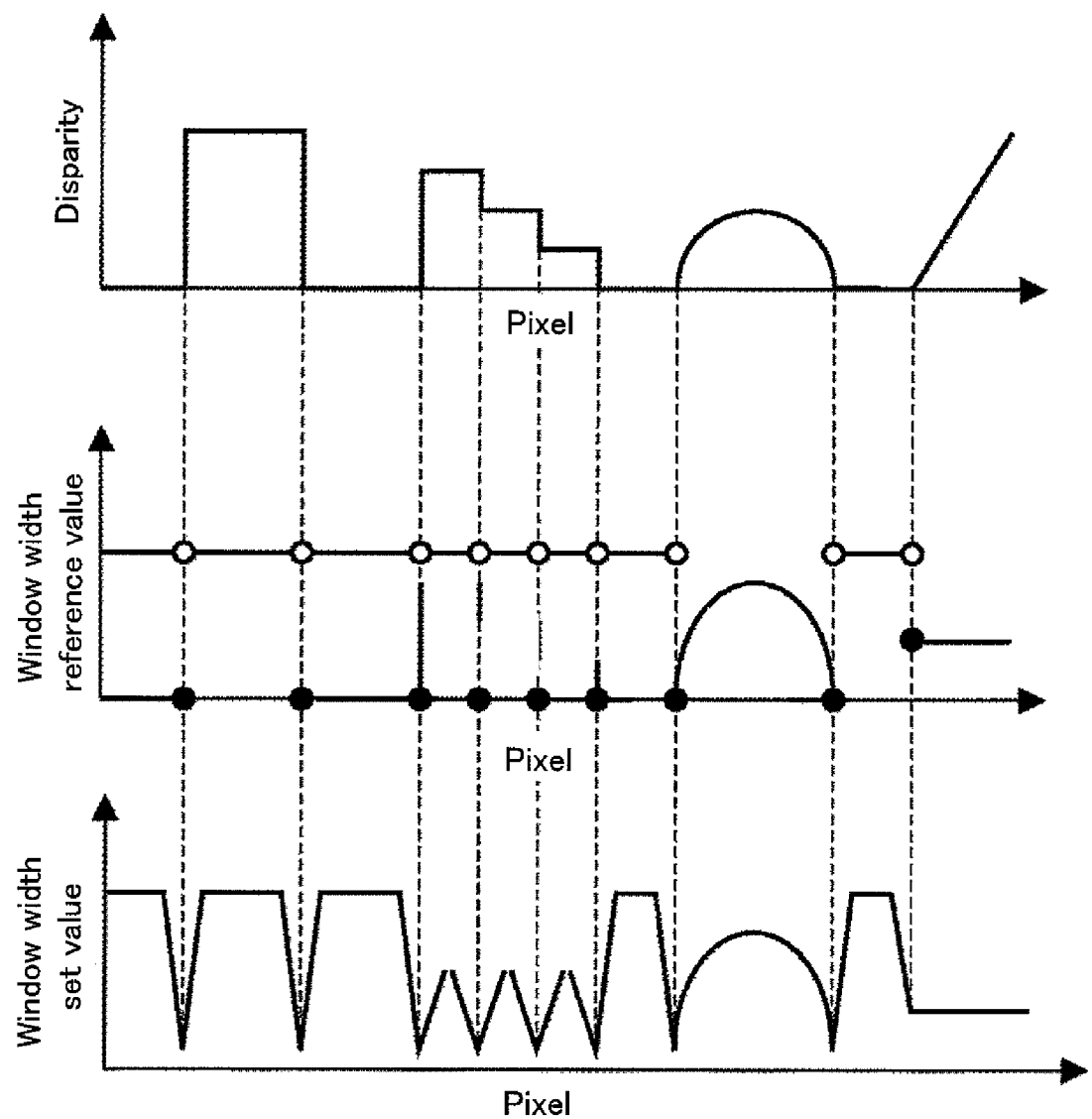
FIG. 7 is a diagram showing a disparity and the window size set for the disparity with the preset technique according to the present invention.

The window size reference value is used to set the ideal window size. As described above, the ideal window size desirably increases gradually from a pixel with the disparity significantly changed and decreases gradually to the next appearing pixel with the disparity reduced. Therefore, if the window size set value is smaller than the window size reference value, the window size set value for a certain pixel is set to be larger than that for the preceding pixel by one. If the window size set value is equal to the window size reference value, the window size reference value is used as a set value. However, the window size needs to vary gradually until the next appearing disparity is reduced. Thus, the pixel appearing after the pixel of interest and involving a reduced disparity is calculated. Then, the window size is varied in decrements of 1 down to the window size to be set for the next appearing pixel so that the pixels are smoothly connected together. This is shown in FIG. 7. For example, if the disparity is as shown in the upper part of FIG. 7, the window size value is as shown in the lower part of FIG. 7. That is, the window size reference value is the upper limit of the window size set value, and the absolute amount of variation in window size set value is limited to at most 1.

Figure 8:
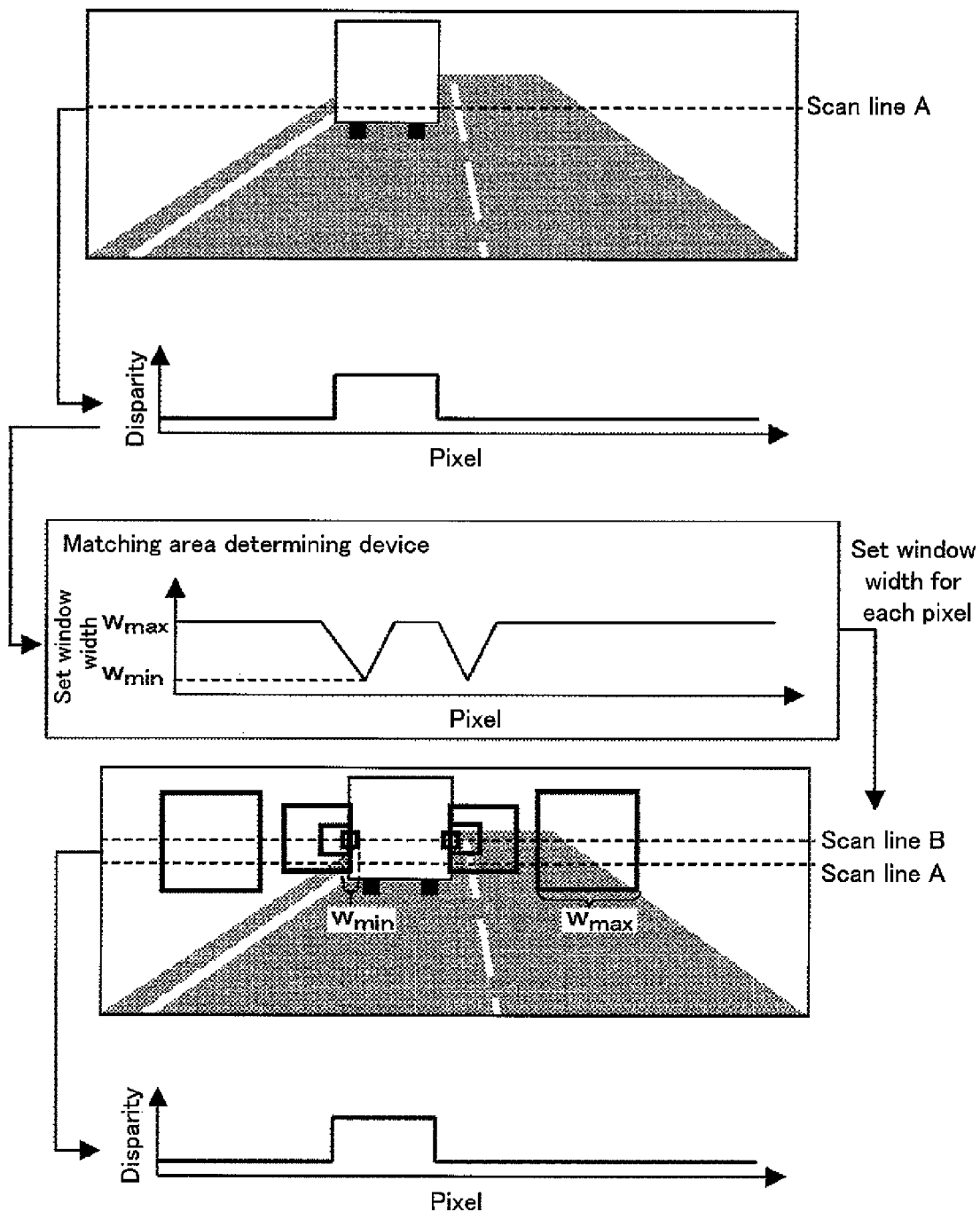
FIG. 8 is a diagram illustrating the flow of a series of window size setting operations according to the present invention.

How to set the matching area window size is schematically shown in FIG. 8.

If an image is sequentially scanned from the bottom of the screen, the disparity on a scan line A is defined as a calculated disparity, and the disparity on a scan line B is calculated based on the calculated disparity. Based on the calculated disparity on the scan line A, the window size set value for each pixel on the scan line B is obtained. The window size set value obtained is used to calculate the disparity for each pixel on the scan line B.

FIG. 8 shows that the horizontal window size and the vertical window size are changed in conjunction with each other. However, this is illustrative, and the horizontal and vertical window sizes may be separately set. The horizontal window size is set by the above-described setting method. For the vertical window size, a vertical variation in disparity is calculated based on information on the preceding scan line and the scan line preceding the preceding scan line. Then, based on the value of the vertical variation, the window size reference value and the window size are set. The maximum and minimum values of the window size may be set separately from the maximum and minimum window sizes in the horizontal direction.

Provided that the vertical variation in disparity can have been calculated for all the pixels in the vertical direction, the window size reference value can be calculated and used to set the window size as in the case of the horizontal direction. This processing can be achieved, for example, if a pixel in the preceding frame image can be associated as calculated disparity information and be utilized. If sensors are installed in a mobile object as in the case of vehicle-mounted cameras, disparity information on the preceding frame and disparity information on the frame of interest may be associated with each other by image processing such as an optical flow. However, in view of calculation speed and accuracy, information from other sensors such as acceleration sensors or steering angle sensors may be effectively utilized. As shown in FIG. 8, if information on the preceding scan line is used as disparity, the window size reference value may be calculated from the disparity gradients for the preceding scan line and the scan line preceding the preceding scan line so that the window size reference value itself can be utilized as a window size. Furthermore, although not shown in FIGS. 1, 2, 14, 15, and 16, the input image itself, the image in the preceding frame, or a feature amount such as an edge which is extracted from the image may be utilized as information for window size calculation.

Furthermore, the calculated disparity data stored in the calculated disparity storage unit 105 may be, instead of image pickup information from the cameras, disparity data calculated using information from other sensors such as millimeter-wave radars, laser radars, or ultrasonic devices. Furthermore, such sensor information may be utilized to detect an object, and disparity data acquired may be utilized.

The disparity edge-preserving smoothing filter 204 receives calculated disparity data from the calculated disparity storage unit 105 and then applies the edge-preserving smoothing filter to the calculated disparity data. The disparity edge-preserving smoothing filter 204 leaves the features of portions with significantly changed disparities resulting from occlusion, with the other, noise components smoothed. Thus, disparity changes resulting from occlusion or the like are accurately calculated.

Figure 9:
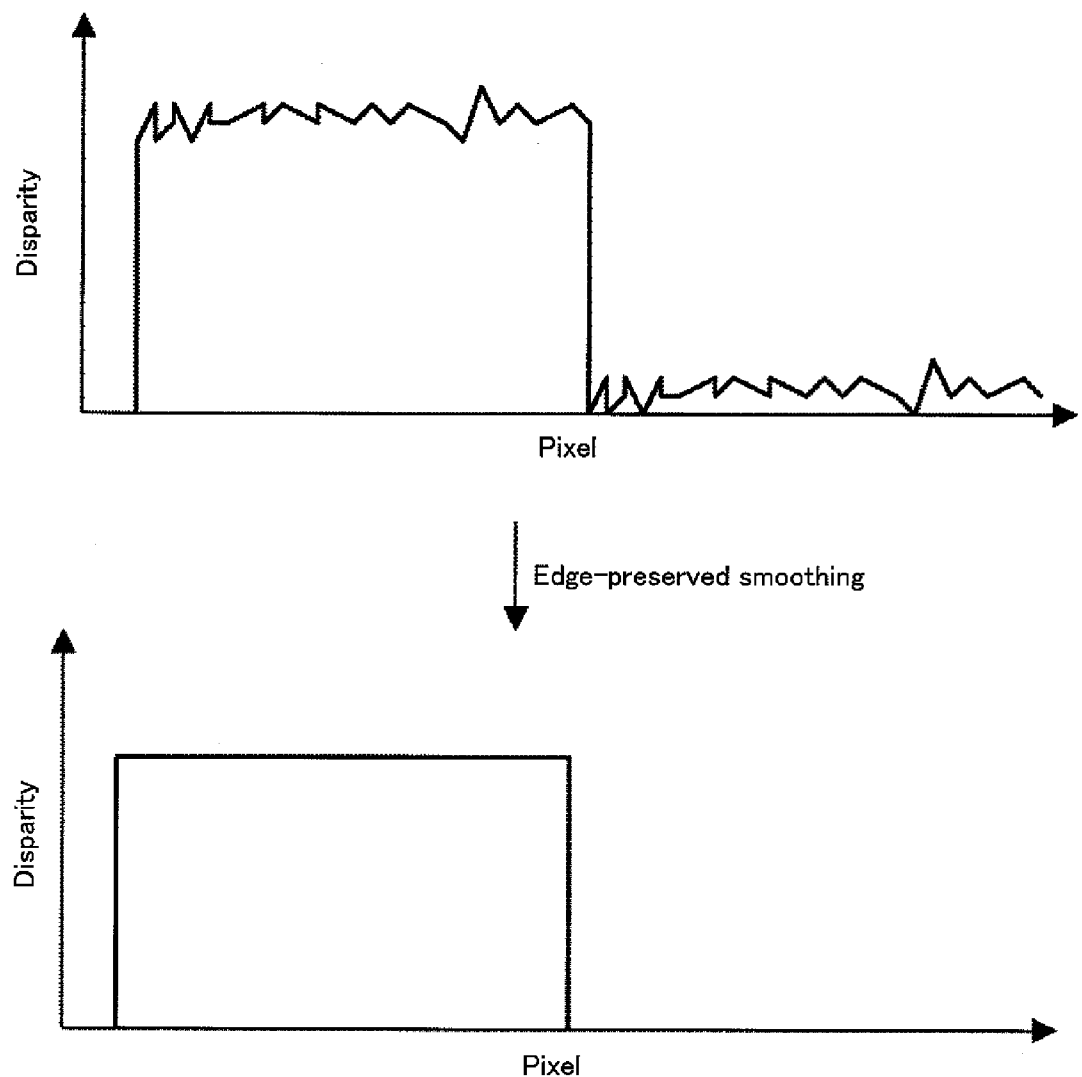
FIG. 9 is a diagram showing results for a disparity edge-preserving smoothing filter according to the present invention.

FIG. 9 shows an example in which the edge-preserving smoothing filter is applied. As shown in FIG. 9, the edge-preserving smoothing filter corresponds to a filtering process of performing smoothing with steep edges maintained. Examples of the edge-preserving smoothing filter include a s-filter and a bilateral filter. This process uses disparity data on the preceding scan line and thus eliminates the need for a new procedure involving a processing load. Consequently, calculations can be executed at high speed.

Figure 10:
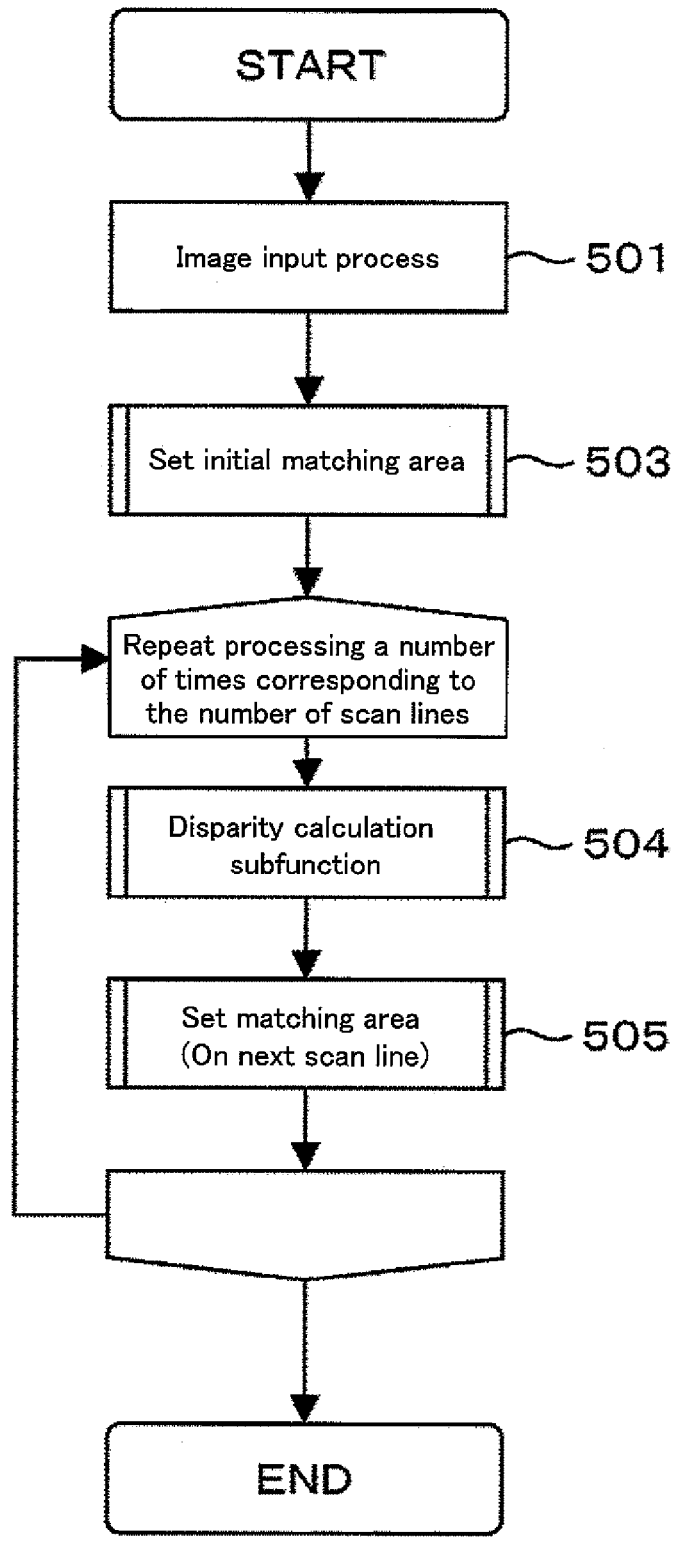
FIG. 10 is a diagram showing a flowchart of a stereo image processing method according to the present invention.

The flow of a series of processes from pickup of an image through estimation of the disparity which processes are executed by the stereo image processing apparatus as described above will be described with reference to the flowchart in FIG. 10.

First, in an image input process in step 501, right and left image data are read from the image pickup unit 101. Then, in step 503, the matching area control unit 103 executes an initial matching area setting process. In this case, a special process is executed because there is no calculated disparity information at the start of the relevant program operation. This will be described below in detail. In step 504, the disparity calculating unit 104 executes a subroutine for calculating a disparity based on a set matching area. The configuration of the subroutine will be described below in detail. In step 505, if, for example, calculations are executed on a scan line basis, the disparity on the scan line determined by the disparity calculation subroutine is used to determine a matching area on the next scan line. Steps 504 and 505 correspond to a process repeated a number of times corresponding to the number of scan lines.

Figure 11:
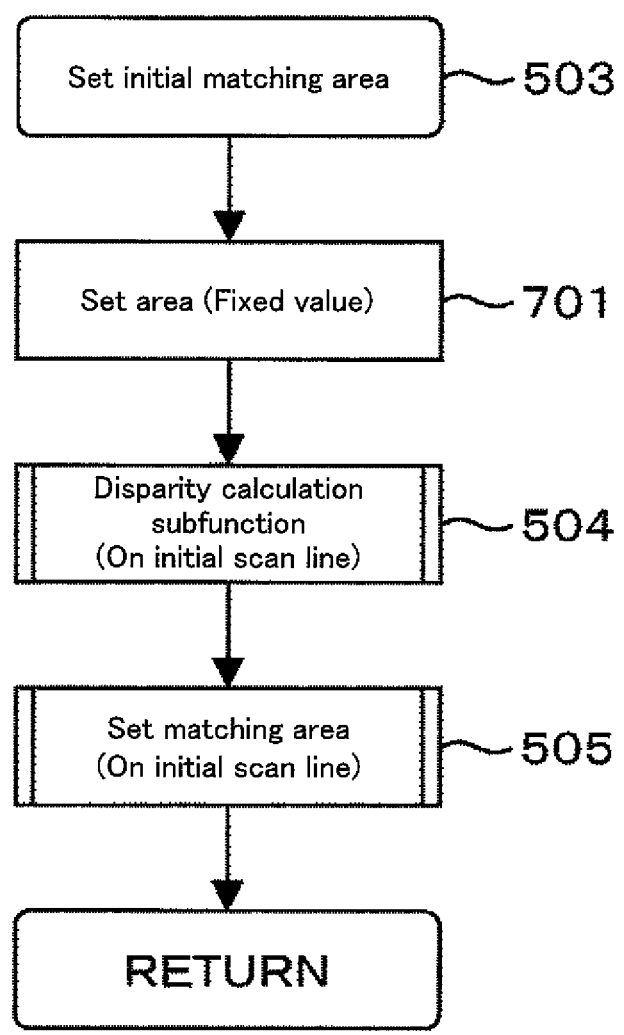
FIG. 11 is a diagram showing a flowchart of an initial matching area setting subroutine according to the present invention.

The initial matching area setting subroutine in step 503 is configured as shown in FIG. 11. In step 701, a matching area is set uniformly for each pixel. In step 504, the disparity calculation subroutine determines the disparity. In step 505, based on the calculated disparity, the matching area setting subroutine is configured to set a matching area. Alternatively, the process may proceed to the next scan line based on a disparity calculated using a fixed value and serving as a correct solution.

Figure 12:
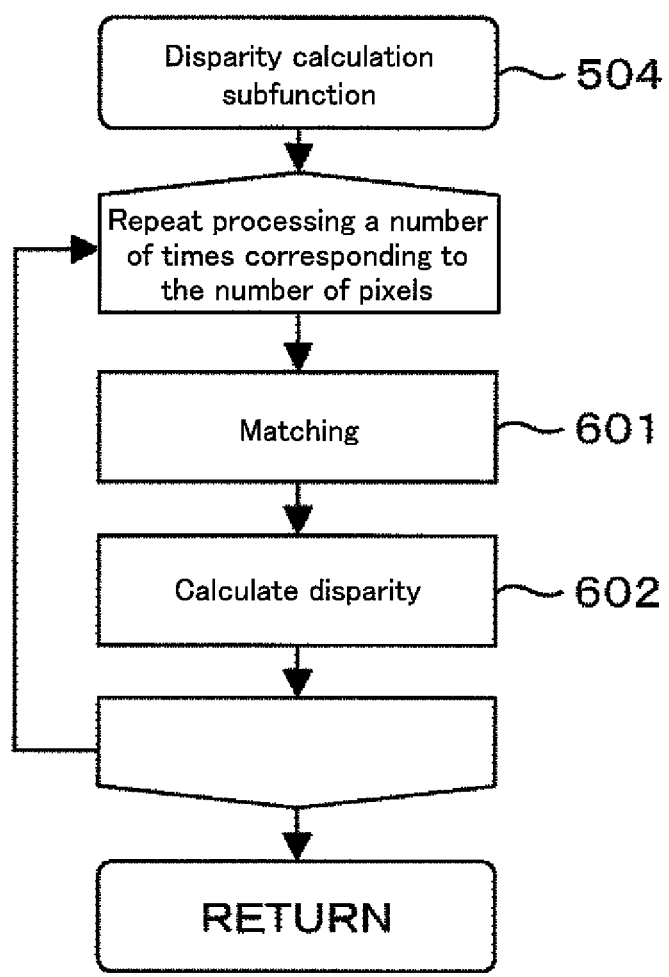
FIG. 12 is a diagram showing a flowchart of a disparity calculation subroutine according to the present invention.

The disparity calculation subroutine in step 504 is configured as shown in FIG. 12. Matching 612 and disparity calculation 602 are performed for each pixel. In the matching 601, matching is performed on a matching area determined by a matching area setting subroutine described below. A matching area is selected from a reference image; the matching area has a window size obtained by the matching area setting subroutine, and is centered around a pixel of interest on a scan line. A matching process is then executed on each pixel in the reference image using the value of the pixel within the window size obtained by the matching area setting subroutine. As an evaluation function for a matching degree, any one of various methods may be adopted, such as SAD, SSD, a normalized correlation function, increment sign correlation, and an orientation code. In the disparity calculation 602, a pixel with the smallest matching value based on SAD or SSD is searched in the reference image. Then, the disparity is calculated from the difference in position between the pixel with the smallest matching value and the pixel of interest in the reference image. These processes are executed on all the pixels on the scan line.

Figure 13:
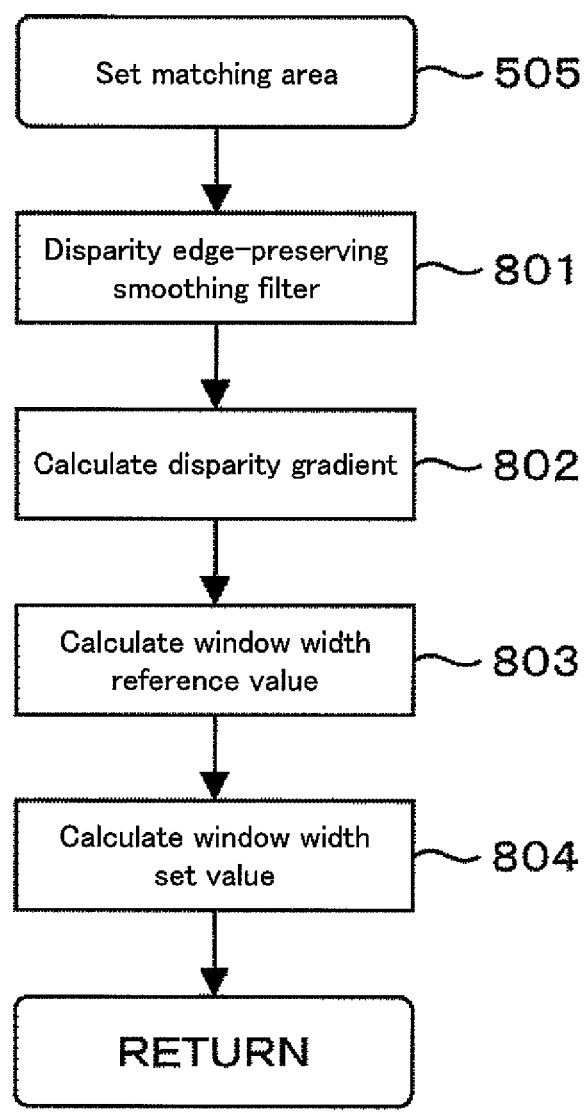
FIG. 13 is a diagram showing a flowchart of a matching area setting subroutine according to the present invention.

The matching area setting subroutine in step 505 is configured as shown in FIG. 13. First, in step 801, the edge-preserving smoothing filter is applied to the data on a scan line to remove noise with disparity edges left. In step 802, the disparity gradient for each pixel on a scan line of interest is calculated. The disparity gradient is calculated by, for example, determining the difference in disparity between each pixel and the adjacent pixel. At this time, the absolute value of the gradient is determined. In step 803, the window size reference value on the scan line of interest is calculated. The window size reference value is calculated by Expression (1). Each of the maximum and minimum window size values is used as a parameter. In step 804, the window size set value on the scan line of interest is calculated. This will be the final set window size value for each pixel. The window size set value is determined using the window size reference value. The window size is set so as to meet the condition that the absolute value of the maximum slope of the window size set value is equal to or smaller than both 1 and the window size reference value.

The matching area setting subroutine in step 505 is configured as shown in FIG. 13. First, in step 801, the edge-preserving smoothing filter is applied to the data on a scan line to remove noise with disparity edges left. This corresponds to the disparity edge-preserving smoothing filter 204 in FIG. 2. In step 802, the disparity gradient for each pixel on a scan line of interest is calculated. The disparity gradient is calculated by, for example, determining the difference in disparity between each pixel and the adjacent pixel. At this time, the absolute value of the gradient is determined. This corresponds to the disparity gradient calculating unit 202 in FIG. 2. In step 803, the window size reference value on the scan line of interest is calculated. The window size reference value is calculated by Expression (1). Each of the maximum and minimum window size values is used as a parameter. In step 804, the window size set value on the scan line of interest is calculated. This will be the final set window size value for each pixel. The window size set value is determined using the window size reference value. The window size is set so as to meet the condition that the absolute value of the maximum slope of the window size set value is equal to or smaller than both 1 and the window size reference value. Steps 803 and 804 correspond to the process executed by the matching area calculating unit 203 in FIG. 2.

The above-described series of processes implement the stereo image matching method that achieves both improved matching accuracy and reduced calculation costs.

Figure 14:
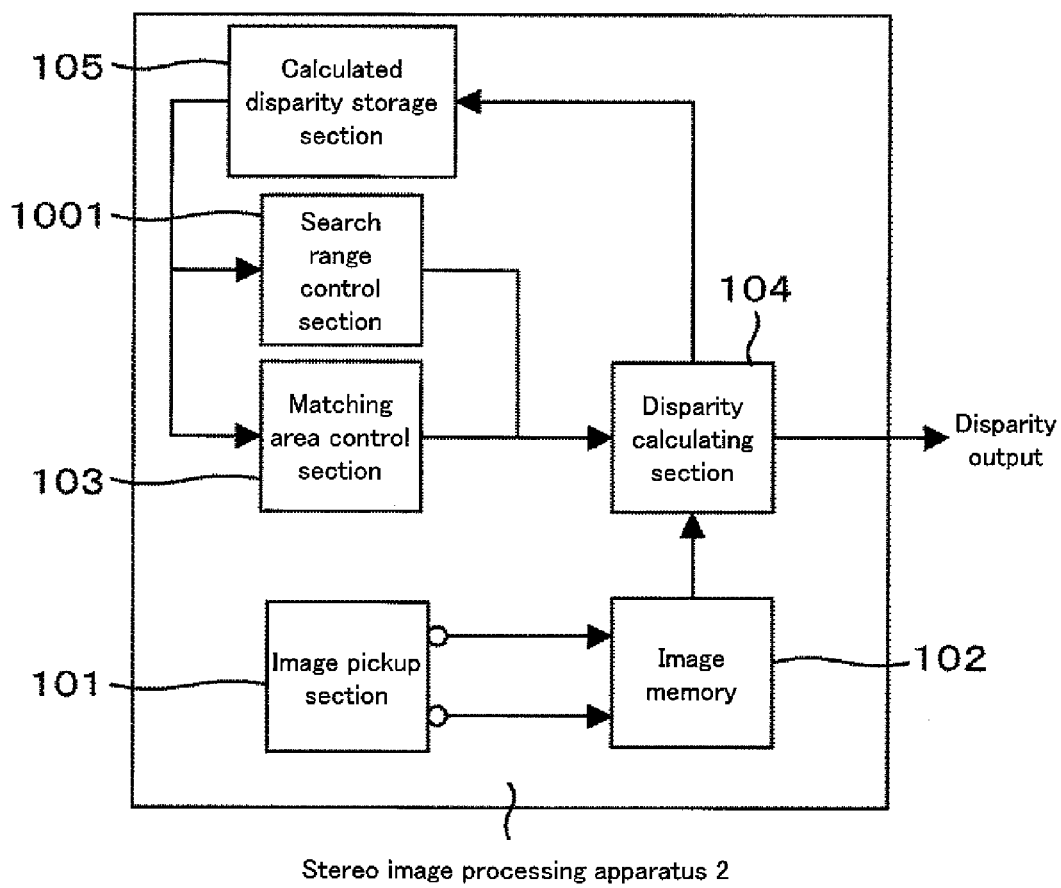
FIG. 14 is a diagram showing another example of the configuration of the stereo image processing apparatus according to the present invention.

In the present embodiment, the above-described stereo image processing apparatus 1 may additionally include a search range control unit 1001 configured to variably control the search range of a matching area based on the disparity on the preceding scan line. Compared with conventional stereo matching, in which all the matching target pixels are searched for, the present configuration utilizes the disparity to reduce the number of matching target pixels. This is expected to reduce the time required for processing. FIG. 14 shows an example of the configuration of a stereo image processing apparatus 2 configured as described above.

The search range control unit 1001 of the stereo image processing apparatus 2 in FIG. 14 uses the calculated disparity data stored in the calculated disparity storage unit 105 to determine the search range (matching range) of the matching position. The matching range of a certain pixel is determined from the disparity value on the preceding scan line corresponding to the pixel. The disparity for a certain pixel is likely to have a value close to that of the corresponding disparity on the preceding scan line. Hence, the true value is likely to be present around an area in which the disparity for the pixel of interest is equal to the disparity on the preceding scan line. Thus, the search may be limited to the pixels located around the above-described area. For example, a range that is wider than the corresponding calculated disparity by a given value is set to be a search range to perform search. In this case, a special process is executed because there is no calculated disparity information at the start of the relevant program operation. For example, this process is similar to the initial matching area setting process in step 503. That is, disparity information is calculated for a processing target area, and the value obtained is utilized as calculated disparity information. In this case, the matching area may be set to be variable or be set using a fixed value.

If the search range control unit 1001 is used, the disparity calculating unit 104 can calculate disparity data using a plurality of image data read from the image memory 102, the matching range determined by the search range control unit 1001, and the matching area set by the matching area control unit 103.

Furthermore, a distance calculating unit 1106 may be provided which calculates the distance to a measurement point in accordance with the principle of triangulation, based on the disparity data calculated by the disparity calculating unit 104 of the stereo image processing apparatuses 1 and 2. The distance calculating unit 1106 is expected to be utilized in various applications; for example, the distance calculating unit 1106 may be utilized in a vehicle application to recognize a frontal traveling environment and to perform control utilizing the recognition result.

Figure 15:
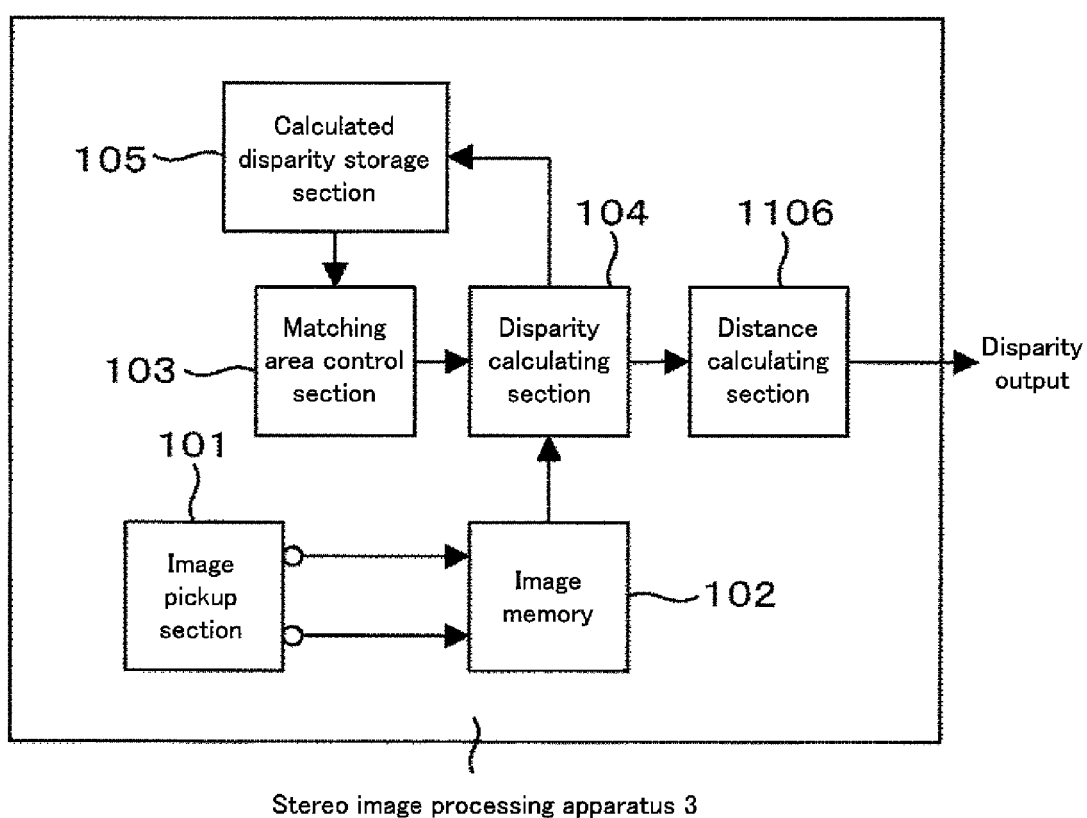
FIG. 15 is a diagram showing another example of the configuration of the stereo image processing apparatus according to the present invention.
Figure 16:
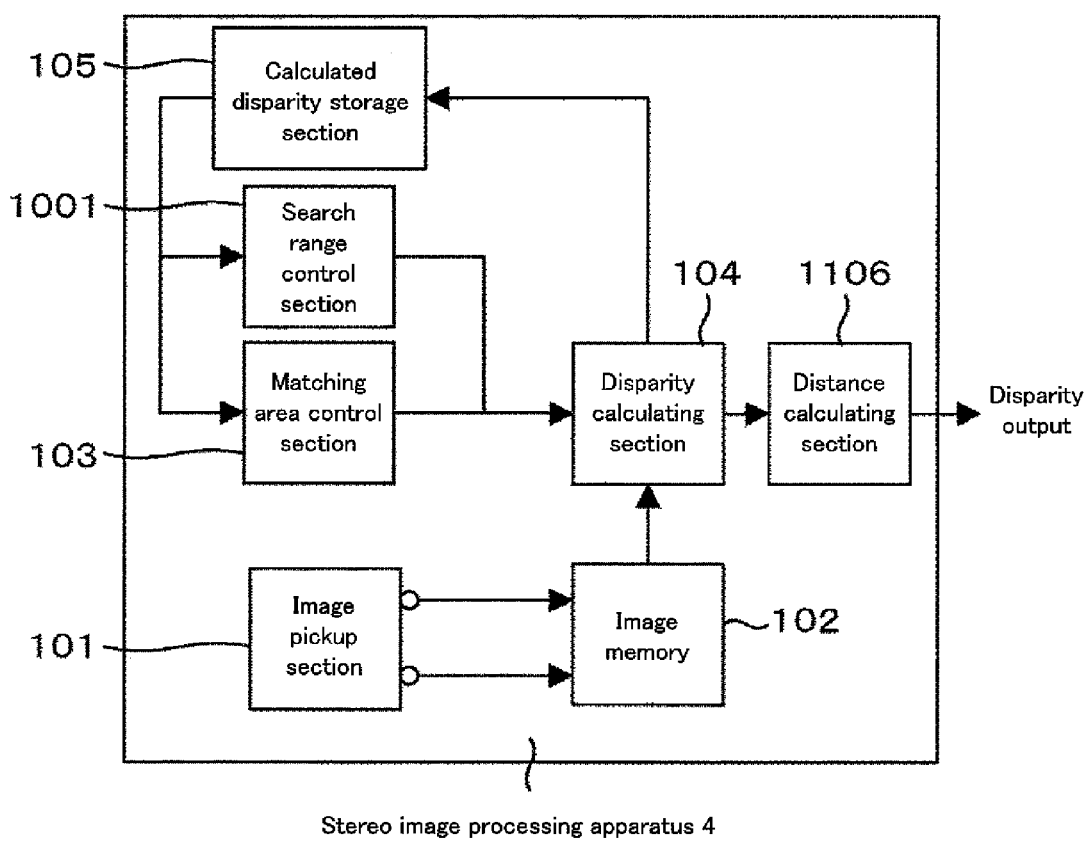
FIG. 16 is a diagram showing another example of the configuration of the stereo image processing apparatus according to the present invention.

Thus, a stereo image processing apparatus 3 may be adopted which corresponds to the stereo image processing apparatus 1 additionally including the distance calculating unit 1106. Moreover, a stereo image processing apparatus 4 may be adopted which corresponds to the stereo image processing apparatus 2 additionally including the distance calculating unit 1106. The stereo image processing apparatus 3 is shown in FIG. 15, and the stereo image processing apparatus 4 is shown in FIG. 16. The distance calculating unit 1106 uses the disparity for each point calculated by the disparity calculating unit 104 to determine the distance to the point based on the principle of triangulation as shown in FIG. 17.

Figure 17:
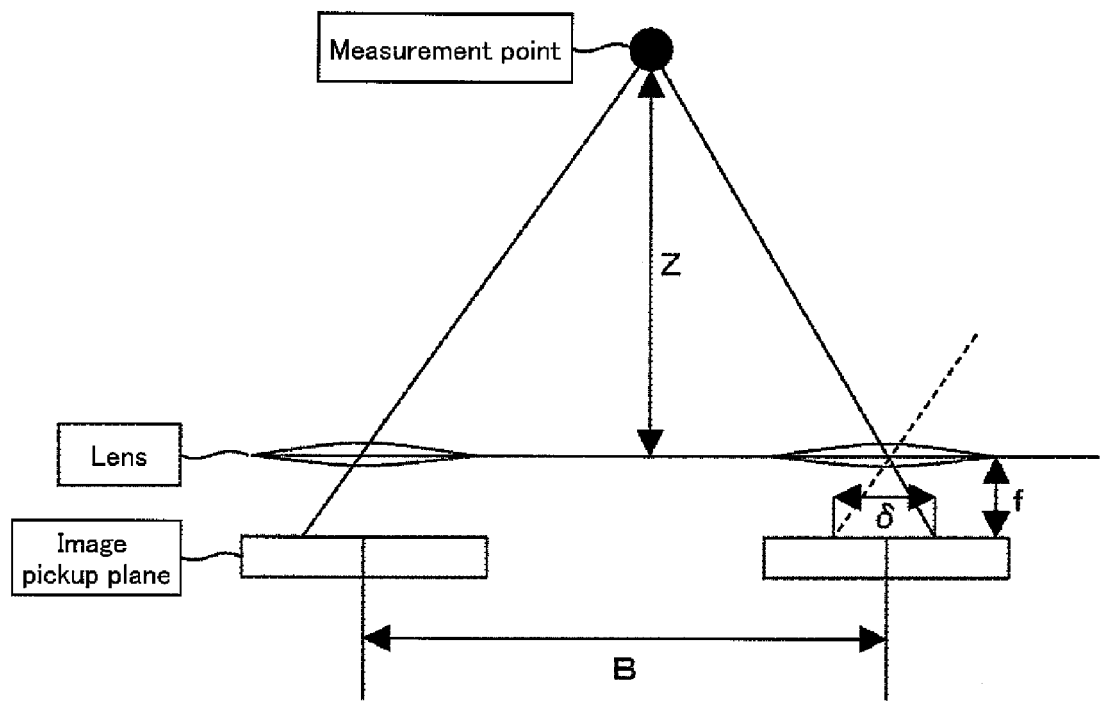
FIG. 17 is a diagram showing the principle of distance measurement for a distance calculating unit according to the present invention.

As shown in FIG. 17, the distance calculating unit 1106 uses a difference in how an object is viewed, that is, disparity, which may occur when images of the same measurement point are picked up using a plurality of cameras, to determine the distance based on the principle of triangulation. When the distance is defined as Z, the distance between the cameras is defined as B, the focal distance of each camera is defined as f, and the disparity is defined as δ, the distance is determined as follows.

[Expression 3]

$$Z = \frac{B \times f}{\delta} \quad \text{(Expression 3)}$$

What is claimed is:

1. A stereo image processing apparatus comprising:
an image pickup unit configured to take a plurality of image data using a plurality of cameras;
an image memory configured to store the plurality of image data taken by the image pickup unit;
a calculated disparity storage unit configured to store disparity data obtained based on the plurality of image data;
a matching area control unit configured to set a matching area for each pixel based on the disparity data read from the calculated disparity storage unit;
a disparity calculating unit configured to perform matching on the image data based on the plurality of image data read from the image memory and the matching area for each pixel set by the matching area control unit to calculate disparity data;
wherein the matching area control unit comprises:
a filter processing unit configured to smooth the disparity data stored in the calculated disparity storage unit with a steep edge maintained;
a disparity gradient calculating unit configured to calculate a disparity gradient based on the disparity data filtered by the filter processing unit; and
a matching area calculating unit configured to set a matching, area for each pixel using the disparity gradient calculated by the disparity gradient calculating unit.

2. The stereo image processing apparatus according to claim 1, wherein disparity data calculated by the disparity calculating unit is stored in the calculated disparity storage unit.

3. The stereo image processing apparatus according to claim 1, wherein the disparity data stored in the calculated disparity storage unit includes disparity data having a spatial adjacency relationship with a target pixel for disparity calculation or disparity data having a time sequence relationship with the target pixel for disparity calculation.

4. The stereo image processing apparatus according to claim 1, further comprising a search range control unit configured to determine a matching range using the disparity data stored in the calculated disparity storage unit, wherein the disparity calculating unit calculates the disparity data using the plurality of image data read from the image memory, the matching range determined by the search range control unit, and the matching area set by the matching area control unit.

5. The stereo image processing apparatus according to claim 1, further comprising a distance calculating unit configured to calculate a distance to a measurement point based on the disparity data calculated by the disparity calculating unit.

6. The stereo image processing apparatus according to claim 1, wherein first image data taken by a first camera provided on a left side of a vehicle and second image data taken by a second camera provided on a right side of the vehicle are stored in the image memory.

7. The stereo image processing apparatus according to claim 1, wherein the matching area calculating unit sets a window size having a negative correlation with a value of the disparity gradient calculated by the disparity gradient calculating unit.

8. The stereo image processing apparatus according to claim 1, wherein the matching area calculating unit sets the window size of the matching area such that the window size has a value between a preset maximum window size value and a preset minimum window size value for the matching area.

9. The stereo image processing apparatus according to claim 1, wherein the disparity data stored in the calculated disparity storage unit is calculated using one of a millimeter-wave radar, a laser radar, and an ultrasonic wave device.

10. A stereo image processing method comprising:
taking a plurality of image data using a plurality of cameras;
storing the plurality of taken image data in an image memory;
setting a matching area for each pixel based on disparity data pre-stored in a calculated disparity storage unit;
performing matching on the plurality of image data based on the set matching area to calculate disparity data;
carrying out filter processing which the disparity data stored in the calculated disparity storage is smoothed with a steep edge maintained;
calculating a disparity radiant based on the filtered disparity data; and
setting a matching area for each pixel using the calculated disparity gradient.

11. The stereo image processing method according to claim 10, further comprising:
determining a matching range using the disparity data stored in the calculated disparity storage unit; and
calculating the disparity data using the plurality of image data read from the image memory, the matching range, and the matching area.

12. The stereo image processing method according to claim 10, further comprising calculating a distance to a measurement point based on the calculated disparity data and outputting the calculated distance information.

* * * * *